(12) United States Patent
Stilwell et al.

(10) Patent No.: US 10,352,801 B2
(45) Date of Patent: Jul. 16, 2019

(54) INTELLIGENT TEMPERATURE AND PRESSURE GAUGE ASSEMBLY

(71) Applicant: Fike Corporation, Blue Springs, MO (US)

(72) Inventors: Bradford T. Stilwell, Blue Springs, MO (US); Bon F. Shaw, Blue Springs, MO (US); Skaria Abraham, Cwmbran (GB); Devang Patel, London (GB); Mark Kendall, Newport (GB); Amos Leap, Grain Valley, MO (US); Yilak Tesfaye, Blue Springs, MO (US)

(73) Assignee: Fike Corporation, Blue Springs, MO (US)

( * ) Notice: Subject to any disclaimer, the term of this patent is extended or adjusted under 35 U.S.C. 154(b) by 66 days.

(21) Appl. No.: 15/591,349

(22) Filed: May 10, 2017

(65) Prior Publication Data
US 2017/0328799 A1 Nov. 16, 2017

Related U.S. Application Data

(60) Provisional application No. 62/334,199, filed on May 10, 2016.

(51) Int. Cl.
*A62C 35/00* (2006.01)
*A62C 35/02* (2006.01)
(Continued)

(52) U.S. Cl.
CPC ............ *G01L 9/045* (2013.01); *A62C 35/023* (2013.01); *A62C 35/13* (2013.01); *A62C 35/68* (2013.01);
(Continued)

(58) Field of Classification Search
CPC ....... A62C 35/00; A62C 35/02; A62C 35/023; A62C 35/13; A62C 35/68; A62C 99/00;
(Continued)

(56) References Cited

U.S. PATENT DOCUMENTS

| | | | | |
|---|---|---|---|---|
| 4,267,890 A | * | 5/1981 | Myers | A62C 37/50 169/75 |
| 4,289,207 A | * | 9/1981 | Wernert | A62C 37/50 109/75 |

(Continued)

FOREIGN PATENT DOCUMENTS

| | | |
|---|---|---|
| CN | 201373787 | 12/2009 |
| CN | 201653608 | 11/2010 |

(Continued)

OTHER PUBLICATIONS

The International Search Report and Written Opinion dated Aug. 11, 2017, in PCT/US2017/031980, filed May 10, 2017.

(Continued)

*Primary Examiner* — Nguyen Q. Ha
(74) *Attorney, Agent, or Firm* — Hovey Williams LLP

(57) ABSTRACT

Intelligent temperature and pressure gauge assemblies (52) for use with vessels (24) having pressurized hazard suppression materials therein include temperature and pressure sensors (136, 138) coupled with a digital processor (72) with associated memory for storing empirical temperature and pressure data. The data includes normalized linear temperature-pressure curves consistent with static or slowly changing temperature conditions experienced by the vessels (24), as well as nonlinear temperature-pressure curves consistent with rapidly changing temperature conditions. In use, the assemblies (52) repeatedly sense temperature and pressure conditions of the hazard suppression material and compare sensed values with stored values, and generate an output in conformance with the comparison. In this fashion, the assemblies (52) compensate for rapidly changing temperatures without generating false failure signals.

34 Claims, 8 Drawing Sheets

(51) Int. Cl.
*A62C 99/00* (2010.01)
*G01L 9/04* (2006.01)
*A62C 35/13* (2006.01)
*A62C 35/68* (2006.01)
*G01L 9/00* (2006.01)
*G01L 19/00* (2006.01)

(52) U.S. Cl.
CPC .......... *A62C 99/0018* (2013.01); *G01L 9/006* (2013.01); *G01L 9/0051* (2013.01); *G01L 19/0092* (2013.01)

(58) Field of Classification Search
CPC ..... A62C 99/0018; G01L 9/006; G01L 9/045; G08B 21/00; G08B 23/00
See application file for complete search history.

(56) References Cited

U.S. PATENT DOCUMENTS

| | | | |
|---|---|---|---|
| 5,183,116 A * | 2/1993 | Fleming | A62C 3/08 137/501 |
| 5,253,532 A | 10/1993 | Kamens | |
| 5,343,755 A | 9/1994 | Huss | |
| 5,460,049 A | 10/1995 | Kirsch | |
| 5,578,993 A | 11/1996 | Sitabkhan et al. | |
| 5,583,295 A | 12/1996 | Nagase et al. | |
| 5,728,933 A | 3/1998 | Schultz et al. | |
| 5,808,541 A | 9/1998 | Golden | |
| 6,258,039 B1 | 7/2001 | Okamoto et al. | |
| 6,494,343 B2 | 12/2002 | McManus et al. | |
| 7,140,257 B2 | 11/2006 | Henson et al. | |
| 7,174,783 B2 * | 2/2007 | McSheffrey, Jr. | A62C 37/50 73/291 |
| 7,726,411 B2 | 6/2010 | McSheffrey, Jr. et al. | |
| 7,954,994 B2 * | 6/2011 | Warth | G01L 19/0092 374/143 |
| 8,443,650 B2 * | 5/2013 | Sitabkhan | G01F 25/0084 73/1.73 |
| 8,701,460 B2 | 4/2014 | Krishna et al. | |
| 2003/0189492 A1 | 10/2003 | Harvie | |
| 2009/0178813 A1 | 7/2009 | Eckholm et al. | |
| 2010/0236796 A1 * | 9/2010 | Chattaway | A62C 37/44 169/46 |
| 2012/0247791 A1 | 10/2012 | Kuczek et al. | |
| 2017/0014657 A1 * | 1/2017 | Rennie | A62C 3/08 |

FOREIGN PATENT DOCUMENTS

| | | |
|---|---|---|
| CN | 101476959 | 3/2011 |
| CN | 202614463 | 12/2012 |
| CN | 202789463 | 3/2013 |
| CN | 203011606 | 6/2013 |
| CN | 102937500 | 12/2013 |
| CN | 203606062 | 5/2014 |
| EP | 0244087 | 11/1987 |
| WO | 2004074803 | 9/2004 |

OTHER PUBLICATIONS

Gabmann, Eugen "Electrnonic Pressure Measurement," Verlag Moderne Industrie, 2010, Süddeutscher Verlag onpact GmbH, 81677 Munich, www.sv-onpact.de.

* cited by examiner

INTELLIGENT TEMPERATURE AND PRESSURE GAUGE ASSEMBLY

CROSS-REFERENCE TO RELATED APPLICATION

This application claims the benefit of U.S. Provisional Patent Application No. 62/334,199, filed May 10, 2016, which is incorporated by reference herein.

BACKGROUND OF THE INVENTION

Field of the Invention

The present invention is broadly concerned with intelligent temperature and pressure gauge assemblies adapted for use with vessels or cylinders, especially those containing hazard suppression materials under pressure, together with combinations of such gauge assemblies with the vessels, overall hazard suppression systems, and corresponding methods. More particularly, the invention is concerned with such intelligent gauge assemblies which are designed to compensate for rapid temperature changes experienced by the vessels, which otherwise may lead to false indications of inoperability.

Description of the Prior Art

Pressure gauges have long been provided with gas or liquid cylinders in order to sense the pressure conditions therein. Conventional gauges typically include a Bourdon tube in the form of a curved tube that is open to external pressure input on one end and is coupled mechanically to an indicating needle on the other end. Pressure from the cylinder is guided into the tube and causes it to flex during pressure changes, resulting in a change in the curvature of the tube. These curvature changes are reported by the dial indicator as an analog pressure readout. Alternately, a strain gauge may be attached to the cylinder to convert the pressure-induced tube deflections into electronic voltage signals to create an output.

While such gauges are inexpensive and suitable for substantially static or only slowly changing temperature conditions, they are deficient when used to monitor cylinders having contents subject to substantial pressure changes owing to rapid ambient temperature fluctuations. For example, vessels or cylinders containing pressurized hazard suppression materials such as liquid or inert agents need to be carefully monitored to ensure that the vessels are ready for emergency use. If the pressure gauges used with such vessels give output readings, usually in the form of excess pressure readings well above normalized values when the vessels are in a rapidly changing high-temperature environment, the vessels may be deemed deficient or inoperable even though they are in fact entirely serviceable. As a consequence, such vessels may be changed out when there is no need to do so.

There is accordingly a need for improved gauge assemblies for vessels containing hazard suppression materials which are intelligent, in that they provide outputs which compensate for rapid ambient temperature changes and prevent false readings indicating that the vessels are inoperable.

The following references describe various types gauge assemblies known in the art: Patents and Publications Nos. U.S. Pat. Nos. 5,253,532, 5,343,755, 5,460,049, 5,583,295, 6,258,039, 6,494,343, 7,140,257, 7,726,411, 8,701,460, US 2003/0189492, US 2012/0247791, CN 101476959, CN 102937500, CN 201373787, CN 201653608, CN 202614463, CN 202789463, CN 203011606, CN 203606062, and EP 0244087, and non-patent literature references: GaBmann, Eugene et al., *Electronic Pressure Measurement*, Süddeutscher Verlag onpact GmbH, Munich 2010, available online at www.sv-onpact.de, and enGauge brochure dated Sep. 30, 2015.

SUMMARY OF THE INVENTION

The present invention overcomes the problems outlined above and provides an intelligent gauge assembly capable of compensating for rapidly changing temperature and pressure conditions within a pressurized material vessel, especially a hazard suppression material vessel, in order to prevent false status abnormal signals under such conditions. The gauge assembly is adapted for coupling with a vessel designed to contain hazard suppression material under pressure in order to repeatedly monitor temperature and pressure conditions therein. The gauge assembly includes structure, typically in the form of a digital processor, memory, and related components, operable to repeatedly sense the temperature and pressure of the material within said vessel, compare the sensed temperature and pressure values with previously determined temperature and pressure values for the material to determine if the sensed temperature and pressure values are consistent with the previously determined values, and provide an output in conformity with the comparison.

In certain embodiments, the gauge assemblies of the invention provide outputs in the form of "Status OK" or "Status Abnormal" indicators, and may also have a digital display of pressure or temperature conditions. Also, the assemblies may include a device for generating wireless condition signals which may be read by a smart phone or tablet computer, for example. Additionally, in a further embodiment, a correction factor may be applied that represents the true internal volume of the vessel; this may provide an even greater level of condition-sensing integrity.

The gauge assembly of the invention is adapted for monitoring vessels holding hazard suppression materials such as those selected from the group consisting of HFC-125 (pentafluoroethane), HFC-227ea (1,1,1,2,3,3,3-heptafluoropropane), FK-5-1-12 ($CF_3CF_2C(=O)CF(CF_3)_2$), HFO-1233zd (E) (Trans-1-chloro-3,3,3-trifluoropropene), IG-55 (50/50 Argon/Nitrogen), IG-541 (52/40/8 Nitrogen/Argon/Carbon Dioxide), IG-100 (Nitrogen), and IG-01 (argon), and mixtures thereof.

The gauge assemblies of the invention are conventionally mounted on the valve unit of a vessel or cylinder, in communication with the interior of the latter. Thus, the invention also includes combinations of hazard suppression vessels and the gauge assemblies. In like manner, the invention relates to overall hazard suppression systems comprising one or more vessels adapted to hold hazard suppression material under pressure, linked to apparatus coupled with the outlet(s) of the vessel(s) for delivery of the hazard suppression material to be protected. In such systems, the gauge assemblies are mounted on the respective vessel(s) for individual monitoring thereof.

The invention also provides a method for monitoring a hazard suppression vessel comprising the steps of repeatedly sensing the temperature and pressure of the material within the vessel; comparing the sensed temperature and pressure values of the material with previously determined expected temperature and pressure values for the material, and determining if the sensed temperature and pressure values are consistent with the expected values; and providing an output in conformity with the comparison.

BRIEF DESCRIPTION OF THE DRAWINGS

FIG. 1 is a schematic representation of a hazard suppression system in accordance with the invention, shown in a configuration for protecting a computer room or the like;

DETAILED DESCRIPTION OF THE PREFERRED EMBODIMENT(S)

The Problem

Figure 9:
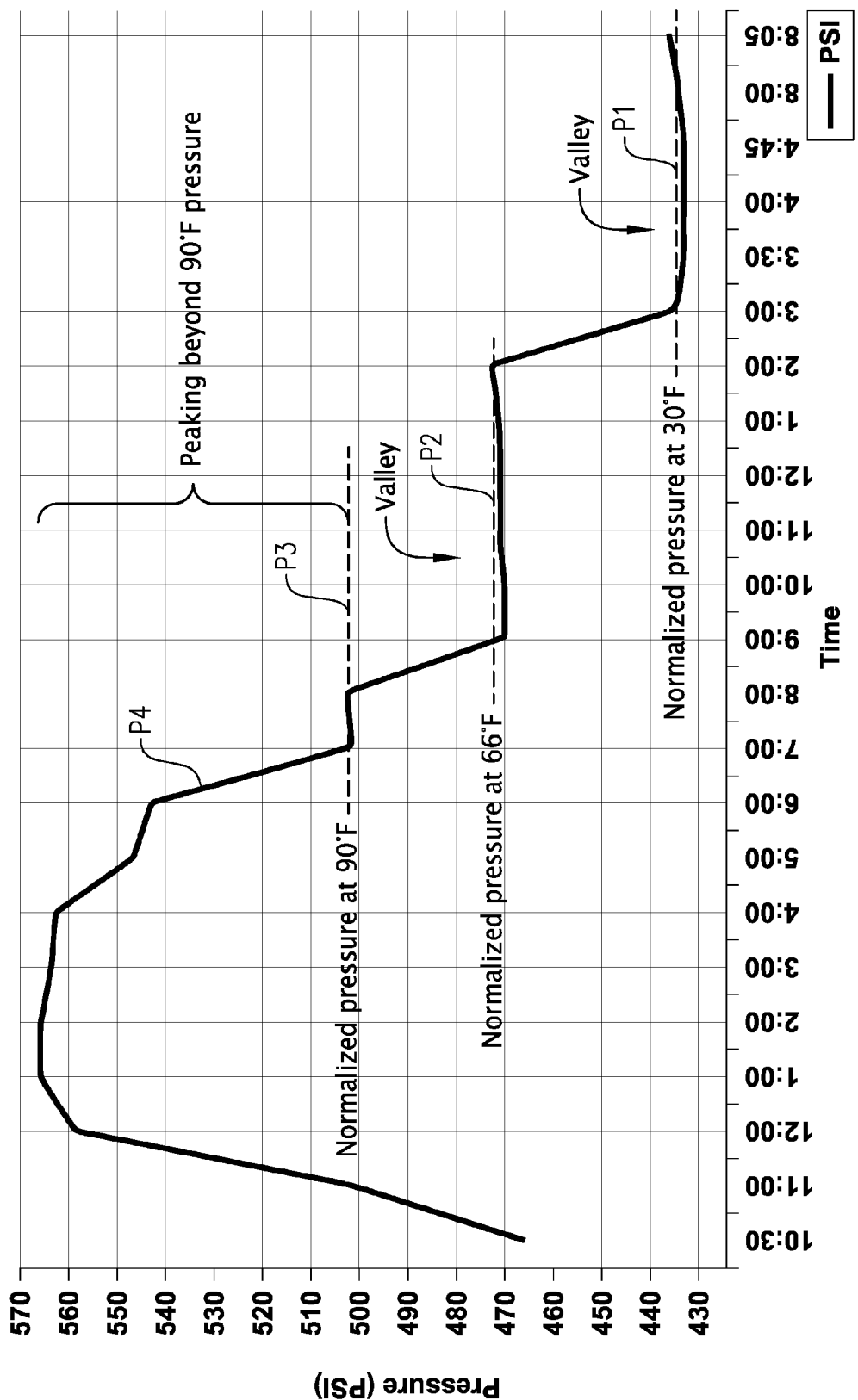
FIG. 9 is a graph of pressure versus time for the contents of a vessel containing hazard suppression material, illustrating normalized linear pressure values at different temperatures for the vessel contents when not subjected to rapid temperature changes, and with a nonlinear graph depicting pressure readings which such a gauge assembly would report in the event that the vessel contents were subjected to a rapid increase in temperature.

It has been discovered that expected temperature-pressure curves for pressurized hazard suppression materials within a vessel are not predictable when such materials are heated or cooled rapidly. This is believed to occur because the gaseous nitrogen propellant forming a part of the materials is desorbed from the active ingredients when the temperature change is rapid, resulting in higher pressure conditions within the vessel above the normalized values. Referring to FIG. 9, it will be observed that three exemplary linear pressure curves P1, P2, and P3 are illustrated, which represent normalized pressure of the contents of a typical hazard suppression material at 30° F., 66° F., and 90° F. If the contents are not subjected to rapid temperature increases or decreases, these linear curves are reasonably accurate. However, in the event that the contents are subjected to a rapid temperature increase, the actual pressures recorded over time are represented by the nonlinear curve P4. Thus, it will be seen that pressures are substantially above linear curve P3, and that, as the temperature decreases, there are slight "valleys" adjacent the linear pressure curves P1 and P2. Moreover, the nonlinear curve P4 can persist for a relatively long period of time, sometimes several days, after a rapid temperature increase of the vessel contents.

A conventional pressure gauge assembly monitoring the pressure of the contents during a rapid heating sequence as exemplified by nonlinear curve P4 will trigger an overpressure alarm, even though the vessel and contents thereof are still in a condition to be used. Similarly, an abrupt lowering of the temperature of the vessel contents will generate other nonlinear pressure curves. Thus, conventional gauge assemblies will often falsely report problems with the vessel and its contents, leading to unnecessary vessel service calls or replacements.

The Hazard Suppression System

Figure 1:
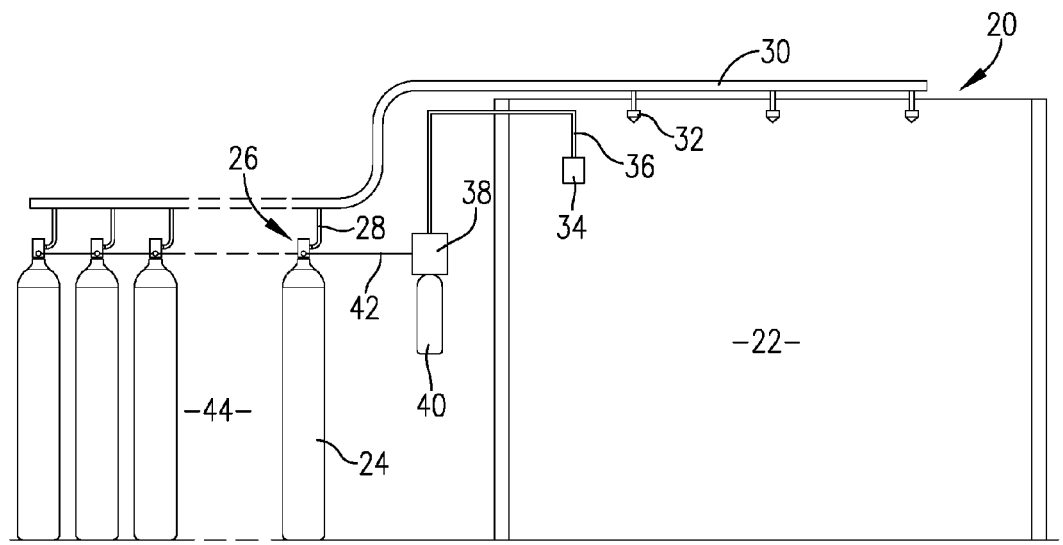

Turning now to the Figures, an exemplary hazard suppression system 20 is schematically illustrated in FIG. 1. The system 20 is designed to protect an enclosed room 22 which may house computer equipment or other valuable components. Broadly speaking, the system 20 includes a plurality of high-pressure inert gas or liquid vessels 24 each equipped with a valve unit 26. Each valve unit 26 is connected via a conduit 28 to a manifold assembly 30. As illustrated, the assembly 30 extends into room 22 and is equipped with a plurality of nozzles 32 for delivery of inert gas or liquid into the room 22 for hazard suppression purposes. The overall system 20 further includes a hazard detector 34 which is coupled by means of an electrical cable 36 to a solenoid valve 38. The latter is operatively connected to a small cylinder 40 normally containing pressurized nitrogen or some other appropriate pilot gas. The outlet of valve 38 is in the form of a pilot line 42 which is serially connected to each of the valve units 26. Alternatively, electrical cable 36 may be connected to a control panel, and the control panel is operably connected with an electronic vessel actuator (not shown) that actuates one or more valve units 26. As depicted in FIG. 1, the plural vessels 24 may be located within an adjacent room or storage area 44 in proximity to the room 22.

Figure 2:
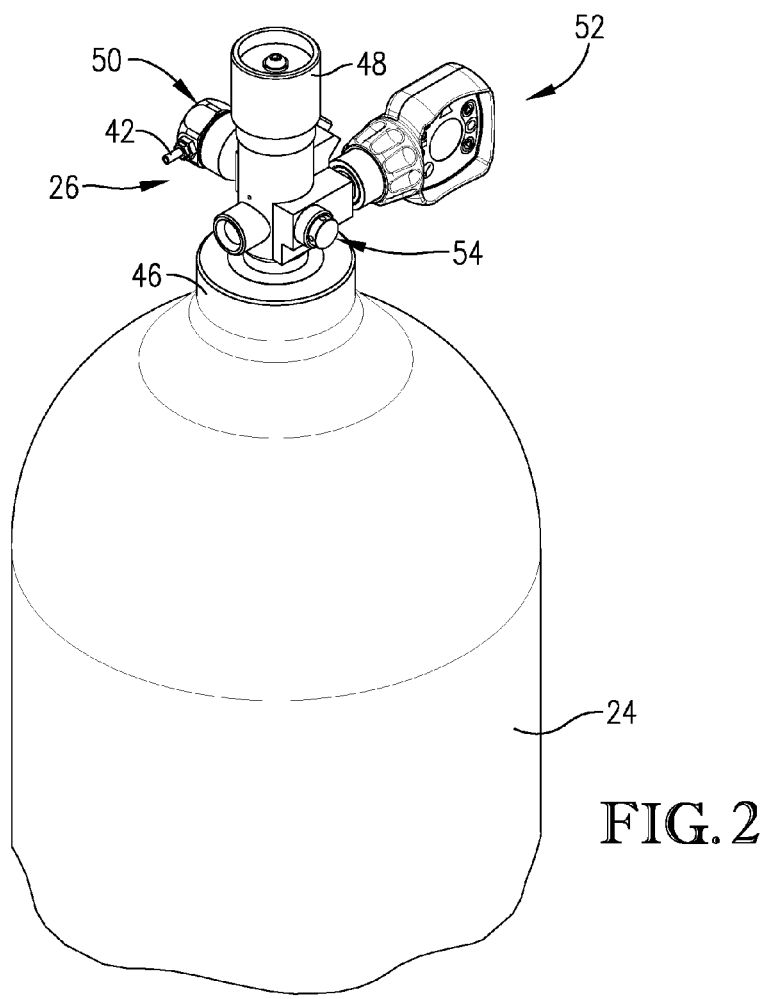
FIG. 2 is a fragmentary isometric view of an inert gas cylinder equipped with a valve unit and improved gauge assembly in accordance with the invention.
Figure 3:
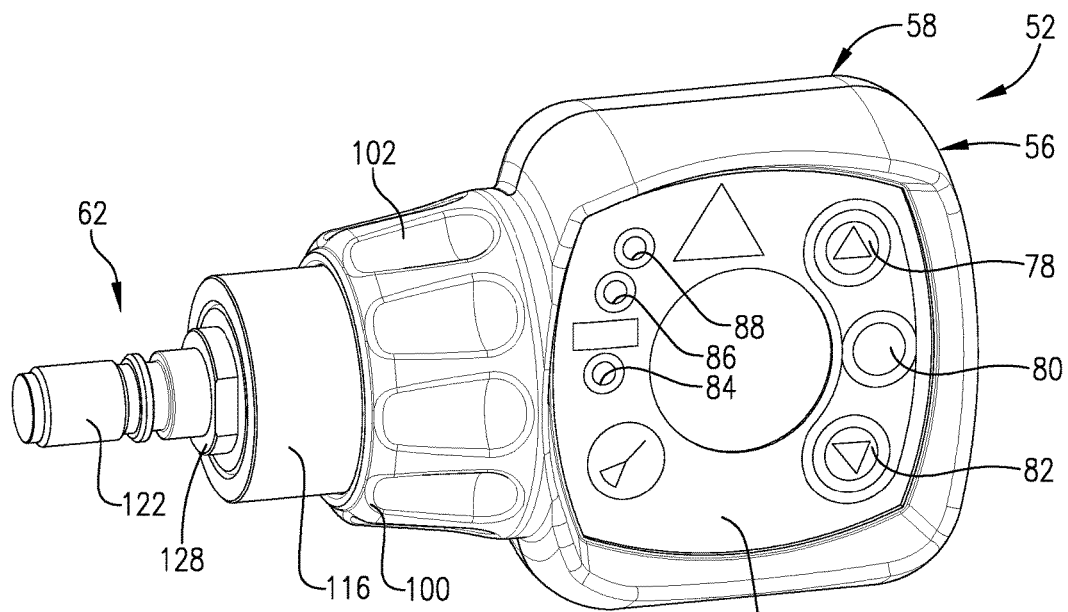
FIG. 3 is an isometric front view of the gauge assembly illustrated in FIG. 2.
Figure 4:
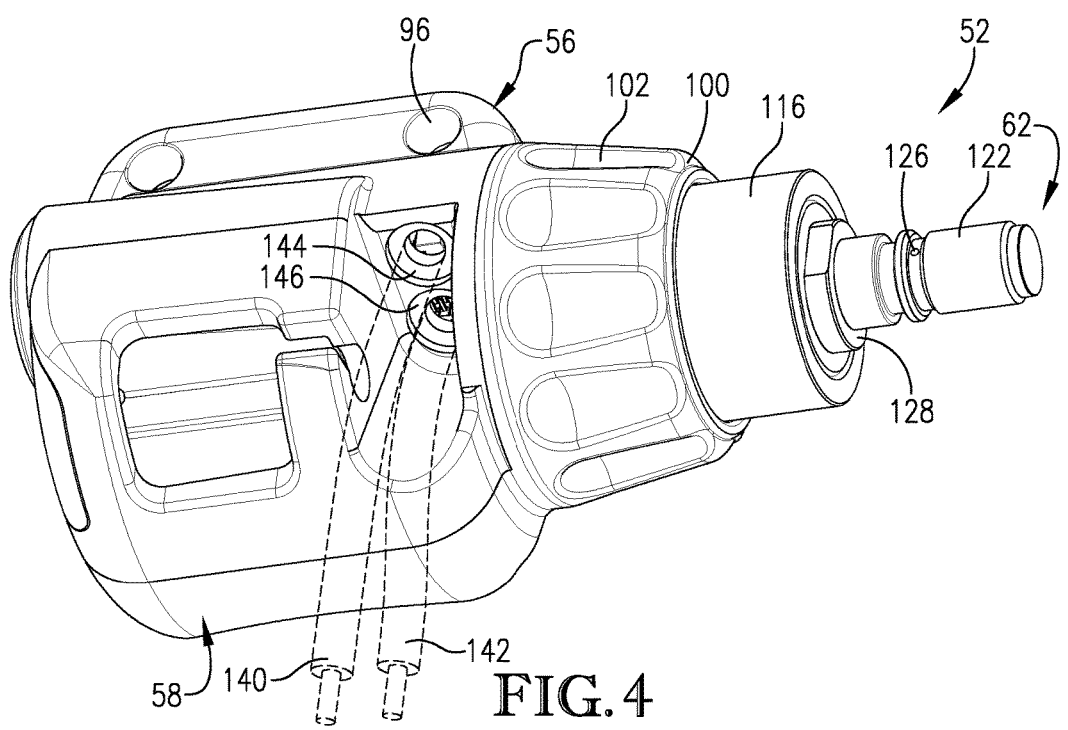
FIG. 4 is an isometric rear view of the gauge assembly illustrated in FIG. 2.

FIG. 2 illustrates a vessel 24, which is conventionally a heavy-walled upright metallic cylinder or canister having an outlet neck 46. The contents of vessel 24 (e.g., various fluorocarbon compounds, nitrogen, argon, carbon dioxide and/or mixtures thereof) is at relatively high-pressure. The valve unit 26 is threaded into neck 46 (see FIG. 2) and includes an upright valve body 48 supporting an actuator 50, the improved pressure gauge assembly 52 of the invention, and rupture disc assembly 54. The valve unit 26 is designed so that the contents of vessel 24 are delivered to manifold assembly 30 for delivery to room 22 via nozzles 32.

The Intelligent Gauge assembly

Turning now to FIGS. 3-8, the gauge assembly 52 generally includes a primary electronics housing 56, a secondary battery housing 58, a housing adaptor 60, a connector assembly 62, and an internal pressure and temperature sensor assembly 64. The assembly 52 is designed to be mounted on the valve unit 26 of vessel 24 in order to repeatedly or iteratively monitor the temperature and pressure conditions of the vessel contents, and to compensate for rapid ambient temperature changes which could otherwise cause the gauge to falsely report conditions of possible inoperability.

In more detail, the primary housing 56 is of quadrate configuration, and receives an electronic circuit board 66, an electronic display 68, and a tactile membrane switch output panel 70. The board 66 includes a programmable digital processor 72, a relay 74, and a Bluetooth wireless communication module 76. The board 66 further has conventional components including digital memory and control elements for the overall assembly 52. The display 68 is itself conventional and may be any type of digital display, such as an LCD display. The membrane switch output screen 70 has programming switches 78, 80, 82, a "Status OK" green LED light 84, a low battery yellow LED light 86, and a warning red LED light 88. Of course, other display configurations and/or combinations of indicator lights (if any) are contemplated by the present invention, and thus, the illustrated embodiments should be viewed as exemplary and not limiting upon the scope of the present invention.

The secondary housing 58 is likewise generally quadrate and includes a battery chamber 90 and a threaded battery chamber cap 92. The chamber 90 is designed to receive at least one battery 94 and, to this end, is equipped with appropriate battery contacts to provide power as necessary to the components of the assembly 52.

Figure 5:
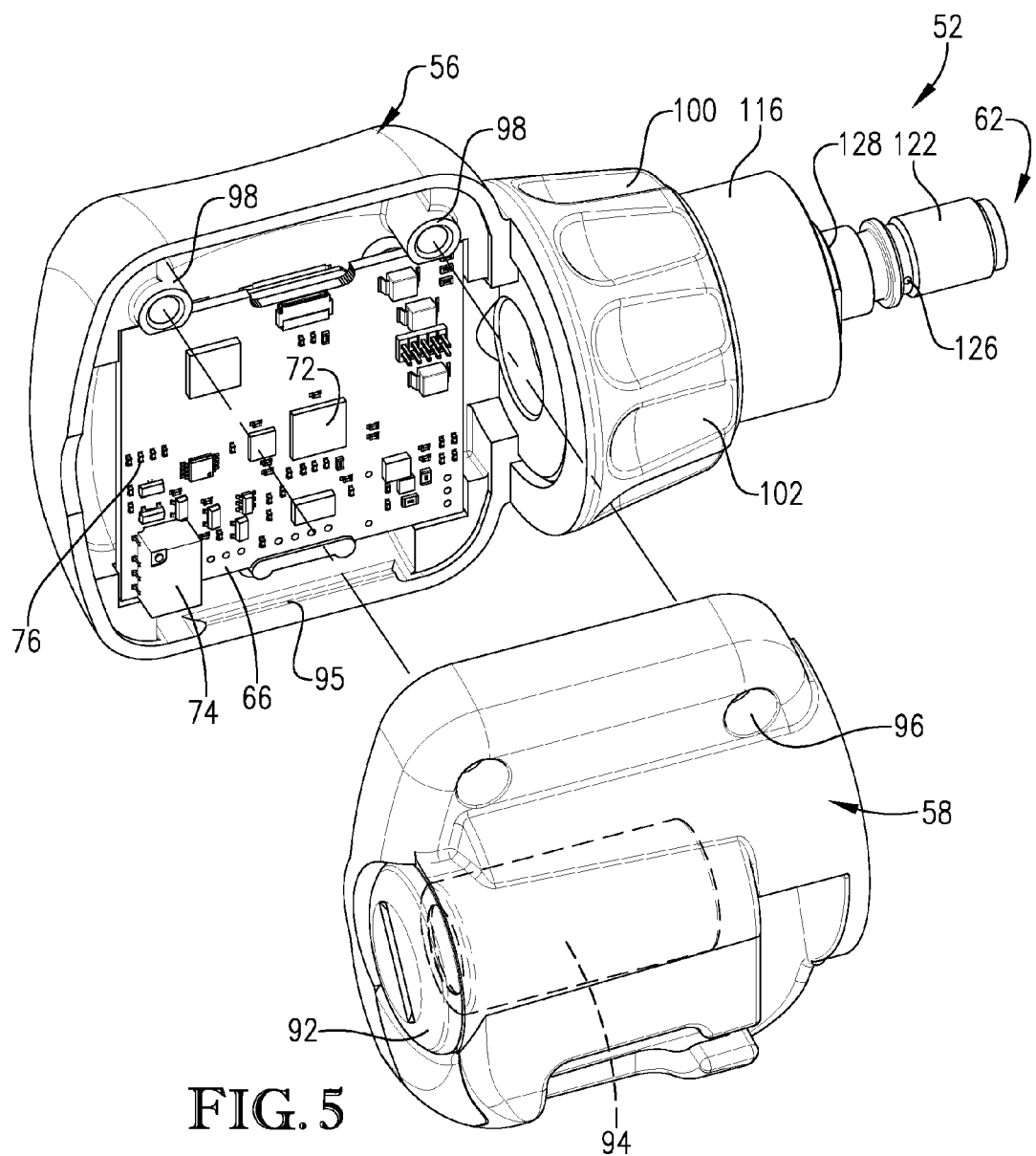
FIG. 5 is an isometric exploded view of the gauge assembly of FIG. 2, illustrating certain internal components thereof.
Figure 6:
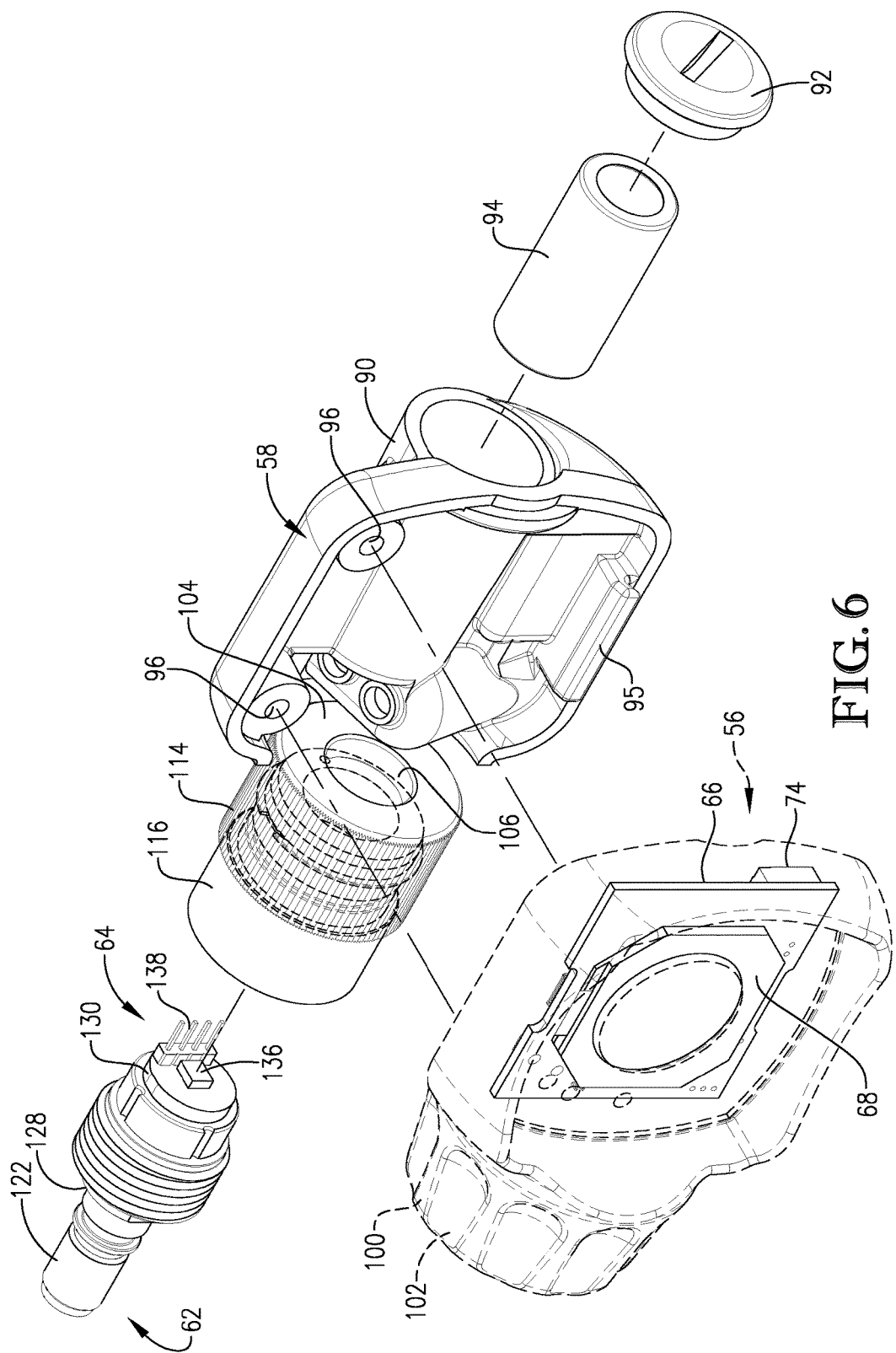
FIG. 6 is an isometric exploded view of the primary housing of the gauge assembly.
Figure 7:
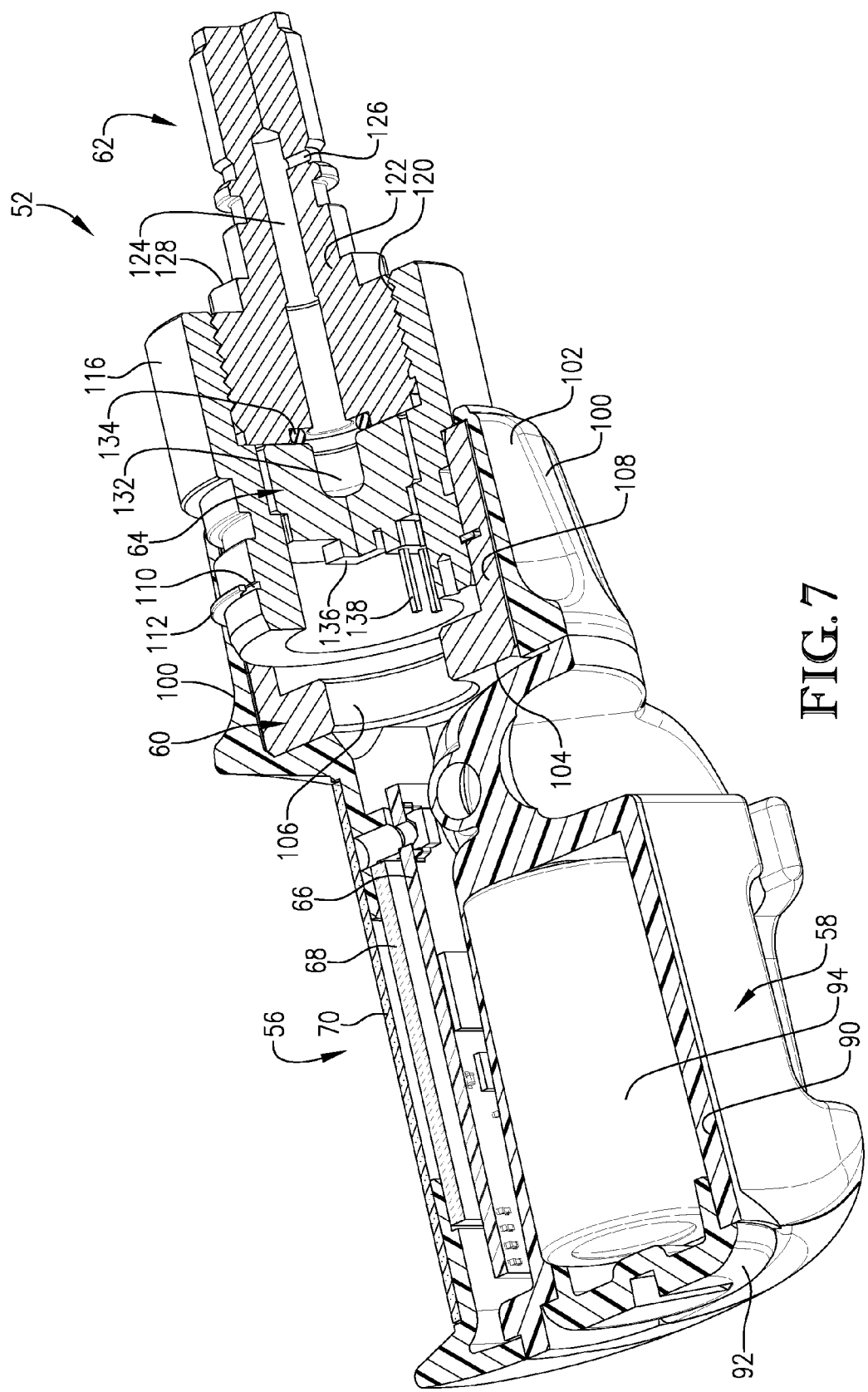
FIG. 7 is a sectional view of the gauge assembly illustrating the internal construction thereof.

The housings 56, 58 are secured together in a face-to-face relationship by means of mated connectors 95 and threaded connectors passing through apertures 96 of housing 58 and into tubular posts 98 forming a part of housing 56. As best illustrated in FIG. 5, the primary housing 56 includes a tubular skirt section 100 presenting a series of elongated indentations 102, and the bottom edge of housing 58 abuts the upper margin of section 100 when the housings 56, 58 are interconnected.

The skirt section 100 receives the adaptor 60, which is generally cup-shaped with an inboard wall 104 having a central opening 106, and a tubular sidewall 108 equipped with an internal groove 110 for receiving snap ring 112. The outer surface of sidewall 108 is roughened or knurled as at 114 (see FIG. 6), to secure the adaptor 60 in place within skirt section 100.

The connector assembly 62 includes an outer tubular section 116 having an internal connection groove 118 adapted to receive snap ring 112 in order to secure the section 116 in place within adaptor 60 and to allow the section 116 to swivel relative to adaptor 60. Additionally, the section 116 has internal threading 120 adjacent the end thereof remote from adaptor 60. The overall connector assembly 62 includes a connector body 122, which is threaded into the section 116 as shown. The connector body 122 has an elongated, central, internal bore 124 as well as a transverse port 126 in communication with the bore 124. The outer surface of body 122 is provided with a peripheral shoulder stop 128 designed to permit attachment to the valve unit 26.

Figure 8:
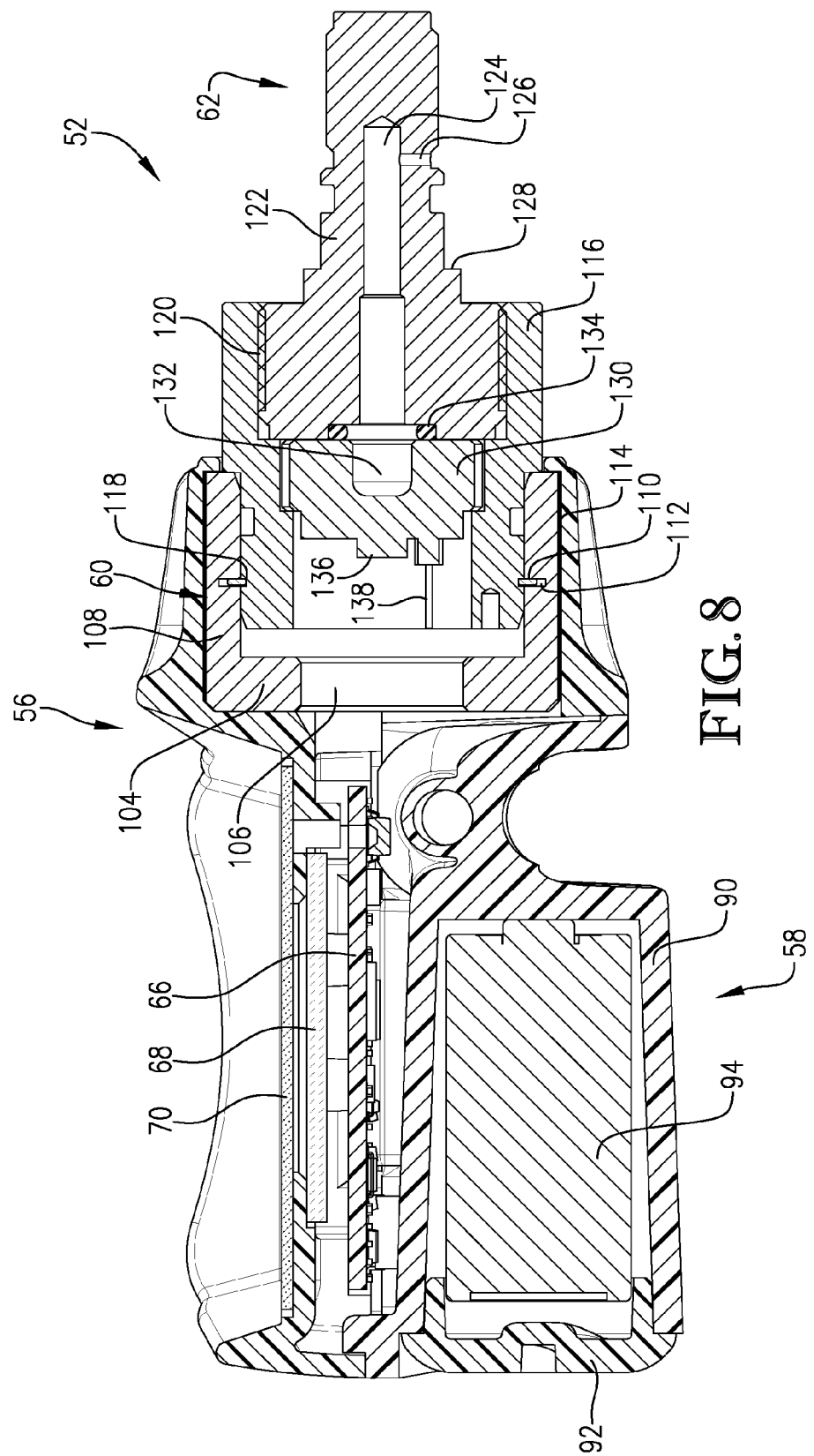
FIG. 8 is a vertical sectional view of the gauge assembly.

The temperature and pressure sensor assembly 64 includes a block 130 having an internal opening 132 in communication with bore 124. An o-ring seal 134 carried by body 122 provides a seal between block 130 and connector body 122 (FIG. 8). The block 130 supports a strain gauge pressure sensor 136, which is in operative communication with the opening 132. In certain embodiments, a temperature probe, such as a thin film resistance temperature detector, may be carried by block 130. Alternatively, the temperature probe may be located on circuit board 66. Electrical connectors 138 can be used to connect the strain gauge pressor sensor 136 and/or the temperature probe, if carried by block 130, to board 66. When the gauge assembly 52 is secured within the valve unit 26, the temperature and pressure conditions of the contents of vessel 24 are sensed via port 126, bore 124, and opening 132. As explained below, during the operation of assembly 52, such pressure and temperature conditions are reported by a visual output through display 68, and also by wireless communication via the module 76. In addition to such wireless communication, data cables 140 and 142 may be operatively connected via relay ports 144 and 146 provided in the secondary housing 58. In certain embodiments, data cables 140 and 142 are connected with a control panel for receiving a simple "open" or "closed" signal regarding a change in operational state of, for example, the valve unit 26, vessel 24, or gauge assembly 52.

It will be understood that there can be a number of different implementations of gauge assembly 52. For example, while a strain gauge-type pressure sensor is employed in some embodiments, other types of pressure-to-electrical transducers may be employed, such as a piezo-type pressure sensor or a capacitive-type pressure sensor. Moreover, the use of a Bluetooth module is not essential, and other types of wireless signal generators may be employed, such as radio frequency (RF), infrared (IR), or any other appropriate electromagnetic regime. The transmitted data may be by amplitude modulation, frequency modulation, phase modulation, pulse modulation, or any other suitable data communication technique. Also, a transceiver may be used in conjunction with or in place of the Bluetooth module 76.

Operation of the Intelligent Gauge Assembly

As an initial matter, a library of empirical data is generated for a plurality of different, typical hazard suppression mixtures such as those described above. This data includes normalized linear (i.e., having a substantially constant slope) pressure curves at different temperatures, as well as nonlinear (i.e., of changing slope) temperature-pressure curves representative of pressures experienced during rapid temperature changes of the hazard suppression materials. Representative linear and nonlinear curves of this type are illustrated in FIG. 9. This data is then stored in the memory associated with digital processor 72, and may be in the form of empirical algorithms or lookup table data.

In operation, the specific hazard suppression material contained within a given vessel is inputted to the gauge assembly 52 via the programming switches 78-82, for example, and the gauge assembly is then mounted on the corresponding valve unit 26 by inserting the connector body 122 into the valve unit so that the port 126 is in communication with the interior of the vessel or cylinder 24. The suppression material information includes, for the particular material and vessel, a range of acceptable pressures and temperatures, e.g., 288-650 psi and 32-130° F.

Figure 10:
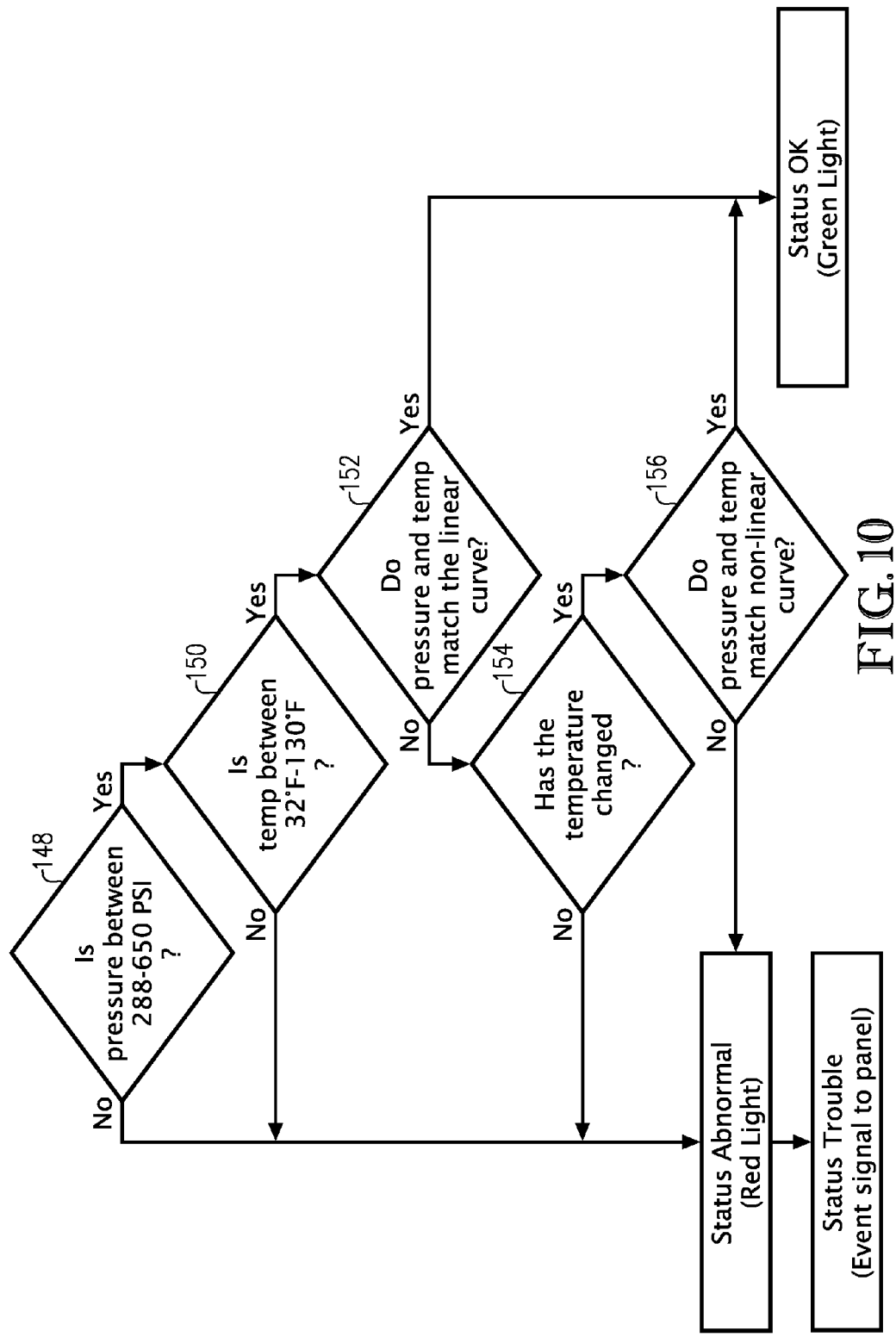
FIG. 10 is a flow diagram illustrating the operation of the improved gauge assembly of the invention.

When the assembly 52 is installed, it repeatedly monitors the vessel by following the flow diagram of FIG. 10. Thus, in Step 148, the assembly 52 senses the pressure condition within the vessel 24, and stores this value in memory. If the pressure conditions are outside the stated exemplary range, the assembly 52 immediately signals an abnormal pressure by illuminating the red warning light 88 and generating a status trouble signal to the display 68. Also, the assembly may generate a wireless trouble signal via the module 76.

If the pressure conditions in Step 148 are within the acceptable range, a "Yes" signal is generated, and the assembly 52 senses the temperature within vessel 24 by means of sensor 138, Step 150, and stores this temperature value in memory. If the sensed temperature is outside of the exemplary acceptable range, a "No" signal is generated and warning light 88 is illuminated, a trouble signal is generated at display 68, and a corresponding wireless signal may also be generated.

If the sensed temperature is within the acceptable range, a "Yes" signal is generated and the assembly 52 determines whether the sensed temperature and pressure conditions match or nearly match the linear temperature-pressure curves originally inputted to the assembly, at Step 152. If this conformance is found, a "Yes" signal is generated and the "Status OK" green light 84 is illuminated. At the same time, a corresponding "OK" signal is sent to display 68 and generated by module 76. If this conformance is not found, a "No" signal is generated, and the sensed temperature is compared with the preceding temperature value stored in memory to determine whether the temperature has changed, Step 154. If no temperature change is detected, a "No" signal is generated, which illuminates the "Status Abnormal" light 88 and gives the other corresponding signals; this condition is generally indicative of a failure of the assembly 52. If a temperature change is detected, a "Yes" signal is generated and the assembly 52 determines whether the changed temperature and corresponding pressure data matches the nonlinear temperature-pressure-time curve inputted for the particular hazard suppression material, Step 156. If there is a match or near-match, a "Yes" signal is generated and the green "Status OK" light 84 is illuminated, together with corresponding signals to the display 68 and Bluetooth module 76. If there is no match or near-match, a "No" signal is generated, and the assembly 52 illuminates the red "Status Abnormal" light 88 with corresponding signals to display 68 and module 76.

In certain embodiments, the initially inputted data to the assembly memory includes information regarding the true internal volume of the vessel. This amounts to a correction factor for the temperature-pressure information.

We claim:

1. A hazard suppression system, comprising:
   a vessel adapted to contain hazard suppression material under pressure, and a selectively openable outlet;
   apparatus operably coupled with said outlet for delivery of said hazard suppression material to an area to be protected against hazard; and
   a gauge assembly operable to monitor temperature and pressure of said hazard suppression material within said vessel over time,
   said gauge assembly including structure operable to repeatedly sense the temperature and pressure of said hazard suppression material within said vessel, a digital processor configured to access a library of empirical data including normalized linear pressure curves for the hazard suppression material at different temperatures and nonlinear pressure curves representative of pressures experienced during rapid temperature changes of the hazard suppression material, the digital processor being configured to compare sensed temperature and pressure values with said library of empirical data for said hazard suppression material to determine if the sensed temperature and pressure values are consistent with said library of empirical data, and provide an output in conformity with the comparison.

2. The system of claim 1, said vessel adapted to hold material selected from the group consisting of HFC-125, HFC-227ea, FK-5-1-12, HFO-1233zd (E), IG-55, IG-541, IG-100, and IG-01, and mixtures thereof.

3. The system of claim 1, said gauge assembly comprising a strain gauge pressure-sensing component.

4. The system of claim 1, said gauge assembly having memory which stores said library of empirical data for said material.

5. The system of claim 4, said memory resident on a circuit board including said digital processor.

6. The system of claim 1, said gauge assembly further including structure operable to generate said output as a wireless signal.

7. The system of claim 1, said gauge assembly including a visual screen operable to display said output.

8. A combination comprising:
   a vessel adapted to contain hazard suppression material under pressure, and a selectively openable outlet for delivery of said material from the vessel; and
   a gauge assembly operable to monitor temperature and pressure of said hazard suppression material within said vessel over time,
   said gauge assembly including structure operable to repeatedly sense the temperature and pressure of said hazard suppression material within said vessel, a digital processor configured to access a library of empirical data including normalized linear pressure curves for the hazard suppression material at different temperatures and nonlinear pressure curves representative of pressures experienced during rapid temperature changes of the hazard suppression material, the digital processor being configured to compare sensed temperature and pressure values with said library of empirical data for said material to determine if the sensed temperature and pressure values are consistent with said library of empirical data, and provide an output in conformity with the comparison.

9. The combination of claim 8, said vessel adapted to hold material selected from the group consisting of HFC-125, HFC-227ea, FK-5-1-12, HFO-1233zd (E), IG-55, IG-541, IG-100, and IG-01, and mixtures thereof.

10. The combination of claim 8, said gauge assembly comprising a strain gauge pressure-sensing component.

11. The combination of claim 8, said gauge assembly having memory which stores said library of empirical data for said material.

12. The combination of claim 11, said memory resident on a circuit board including said digital processor.

13. The combination of claim 8, said gauge assembly further including structure operable to generate said output as a wireless signal.

14. The combination of claim 8, said gauge assembly including a visual screen operable to display said output.

15. A gauge assembly adapted for coupling with a vessel designed to contain hazard suppression material under pressure, said gauge assembly including structure operable to repeatedly sense temperature and pressure of the material within said vessel, a digital processor configured to access a library of empirical data including normalized linear pressure curves for the hazard suppression material at different temperatures and nonlinear pressure curves representative of pressures experienced during rapid temperature changes of the hazard suppression material, the digital processor being configured to compare sensed temperature and pressure values with said library of empirical data to determine if the sensed temperature and pressure values are consistent with said library of empirical data, and provide an output in conformity with the comparison.

16. The assembly of claim 15, said vessel adapted to hold material selected from the group consisting of HFC-125, HFC-227ea, FK-5-1-12, HFO-1233zd (E), IG-55, IG-541, IG-100, and IG-01, and mixtures thereof.

17. The assembly of claim 15, said gauge assembly comprising a strain gauge pressure-sensing component.

18. The assembly of claim 15, said gauge assembly having memory which stores said library of empirical data for said material and a time at which the temperature and pressure values were taken.

19. The assembly of claim 18, said memory resident on said circuit board including a digital processor.

20. The assembly of claim 15, said gauge assembly further including structure operable to generate said output as a wireless signal.

21. The assembly of claim 15, said gauge assembly including a visual screen operable to display said output.

22. A method of monitoring a vessel containing hazard suppression material under pressure, said method comprising steps of:

repeatedly sensing temperature and pressure of the material within said vessel;

comparing sensed temperature and pressure values of the material within said vessel with a library of empirical data including normalized linear pressure curves for the hazard suppression material at different temperatures and nonlinear pressure curves representative of pressures experienced during rapid temperature changes of the hazard suppression material, and determining if said sensed temperature and pressure values are consistent with said library of empirical data; and providing an output in conformity with said comparison.

23. The method of claim 22, including the step of measuring the pressure of said material within said vessel using a strain gauge pressure-sensing component.

24. The method of claim 22, including steps of storing said library of empirical data in memory, storing said sensed temperature and pressure values in memory along with a time at which said sensed temperature and pressure values were taken, and comparing said library of empirical data with said sensed values.

25. The method of claim 22, including the step of generating a wireless signal of said output.

26. The method of claim 22, including the step of generating a visual display of said output.

27. A hazard suppression system, comprising:
a vessel adapted to contain a liquid hazard suppression material including a gaseous propellant under pressure, and a selectively openable outlet;
apparatus operably coupled with said outlet for delivery of said hazard suppression material to an area to be protected against hazard; and
a gauge assembly operable to monitor temperature and pressure of said hazard suppression material within said vessel over time,
said gauge assembly including structure operable to repeatedly sense the temperature and pressure of said hazard suppression material within said vessel, compare sensed temperature and pressure values with previously determined temperature and pressure values for said hazard suppression material to determine if the sensed temperature and pressure values are consistent with the previously determined values, and provide an output in conformity with the comparison,
at least certain of the previously determined values representing pressure conditions resulting from the sorption of the gaseous propellant into the liquid hazard suppression material or desorption of the gaseous propellant from the liquid hazard suppression material due to a rapid change in temperature of the liquid hazard suppression material.

28. A combination comprising:
a vessel adapted to contain a liquid hazard suppression material including a gaseous propellant under pressure, and a selectively openable outlet for delivery of said material from the vessel; and
a gauge assembly operable to monitor temperature and pressure of said hazard suppression material within said vessel over time,
said gauge assembly including structure operable to repeatedly sense the temperature and pressure of said hazard suppression material within said vessel, compare sensed temperature and pressure values with previously determined temperature and pressure values for said material to determine if the sensed temperature and pressure values are consistent with the previously determined values, and provide an output in conformity with the comparison,
at least certain of the previously determined values representing pressure conditions resulting from the sorption of the gaseous propellant into the liquid hazard suppression material or desorption of the gaseous propellant from the liquid hazard suppression material due to a rapid change in temperature of the liquid hazard suppression material.

29. A gauge assembly adapted for coupling with a vessel designed to contain a liquid hazard suppression material including a gaseous propellant under pressure, said gauge assembly including structure operable to repeatedly sense temperature and pressure of the material within said vessel, compare sensed temperature and pressure values with previously determined temperature and pressure values for the material to determine if the sensed temperature and pressure values are consistent with the previously determined values, and provide an output in conformity with the comparison, at least certain of the previously determined values representing pressure conditions resulting from the sorption of the gaseous propellant into the liquid hazard suppression material or desorption of the gaseous propellant from the liquid hazard suppression material due to a rapid change in temperature of the liquid hazard suppression material.

30. A method of monitoring a vessel containing liquid hazard suppression material including a gaseous propellant under pressure, said method comprising steps of:
repeatedly sensing temperature and pressure of the material within said vessel;
comparing sensed temperature and pressure values of the material within said vessel with previously determined expected temperature and pressure values for said material, and determining if said sensed temperature and pressure values are consistent with said expected values, at least certain of the expected values representing pressure conditions resulting from the sorption of the gaseous propellant into the liquid hazard suppression material or desorption of the gaseous propellant from the liquid hazard suppression material due to a rapid change in temperature of the liquid hazard suppression material; and
providing an output in conformity with said comparison.

31. A hazard suppression system, comprising:
a vessel adapted to contain hazard suppression material under pressure, and a selectively openable outlet;
apparatus operably coupled with said outlet for delivery of said hazard suppression material to an area to be protected against hazard; and
a gauge assembly operable to monitor temperature and pressure of said hazard suppression material within said vessel over time,
said gauge assembly including structure operable to repeatedly sense the temperature and pressure of said hazard suppression material within said vessel, compare sensed temperature and pressure values with previously determined temperature and pressure values for said hazard suppression material to determine if the sensed temperature and pressure values are consistent with the previously determined values, and provide an output in conformity with the comparison, said gauge assembly having memory operable to store information about a true internal volume of said vessel.

32. A combination comprising:
a vessel adapted to contain hazard suppression material under pressure, and a selectively openable outlet for delivery of said material from the vessel; and
a gauge assembly operable to monitor temperature and pressure of said hazard suppression material within said vessel over time,
said gauge assembly including structure operable to repeatedly sense the temperature and pressure of said hazard suppression material within said vessel, compare sensed temperature and pressure values with previously determined temperature and pressure values for said material to determine if the sensed temperature and pressure values are consistent with the previously determined values, and provide an output in conformity with the comparison, said gauge assembly having memory operable to store information about a true internal volume of said vessel.

33. A gauge assembly adapted for coupling with a vessel designed to contain hazard suppression material under pressure, said gauge assembly including structure operable to repeatedly sense temperature and pressure of the material within said vessel, compare sensed temperature and pressure values with previously determined temperature and pressure values for the material to determine if the sensed temperature and pressure values are consistent with the previously determined values, and provide an output in conformity with the comparison, said gauge assembly having memory operable to store information about a true internal volume of said vessel.

34. A method of monitoring a vessel containing hazard suppression material under pressure, said method comprising steps of:
repeatedly sensing temperature and pressure of the material within said vessel;
comparing sensed temperature and pressure values of the material within said vessel with previously determined expected temperature and pressure values for said material, and determining if said sensed temperature and pressure values are consistent with said expected values;
providing an output in conformity with said comparison; and
storing information about a true internal volume of said vessel in said memory.

* * * * *